United States Patent [19]

Brekner et al.

[11] Patent Number: 5,371,158

[45] Date of Patent: * Dec. 6, 1994

[54] BULK POLYMERIZATION USING SPECIFIC METALLOCENE CATALYSTS FOR THE PREPARATION OF CYCLOOLEFIN POLYMERS

[75] Inventors: Michael-Joachim Brekner, Franfurt am Main; Frank Osan, Kelkheim; Jürgen Rohrmann, Liederbach; Martin Antberg, Hofheim am Taunus, all of Germany

[73] Assignee: Hoechst Aktiengesellschaft, Frankfurth am Main, Germany

[ * ] Notice: The portion of the term of this patent subsequent to Feb. 11, 2009 has been disclaimed.

[21] Appl. No.: 87,024

[22] Filed: Jul. 2, 1993

Related U.S. Application Data

[63] Continuation of Ser. No. 791,566, Nov. 12, 1991, abandoned, which is a continuation-in-part of Ser. No. 548,083, Jul. 5, 1990, Pat. No. 5,087,677.

[30] Foreign Application Priority Data

Nov. 14, 1990 [DE] Germany ............................ 4036264

[51] Int. Cl.$^5$ ................................................ C08F 4/62
[52] U.S. Cl. ...................................... 526/127; 526/132; 526/160; 526/169.2; 526/281; 526/308
[58] Field of Search ...................... 526/127, 169.2, 132, 526/281, 160, 308

[56] References Cited

U.S. PATENT DOCUMENTS

| | | | |
|---|---|---|---|
| 4,178,424 | 12/1979 | Tenney et al. | 526/283 |
| 5,003,019 | 3/1991 | Ishimaru et al. | 526/160 |
| 5,087,677 | 2/1992 | Brekner et al. | 526/160 |

FOREIGN PATENT DOCUMENTS

| | | |
|---|---|---|
| 0156464 | 10/1985 | European Pat. Off. . |
| 0283164 | 9/1988 | European Pat. Off. . |
| 0358103 | 3/1990 | European Pat. Off. . |
| 0407870 | 1/1991 | European Pat. Off. . |
| 3835044 | 4/1990 | Germany . |
| 90/5308 | of 0000 | South Africa . |

*Primary Examiner*—Joseph L. Schofer
*Assistant Examiner*—David Wu
*Attorney, Agent, or Firm*—Curtis, Morris & Safford

[57] ABSTRACT

Bulk polymerization using specific metallocene catalysts for the preparation of cycloolefin polymers Polymers of polycyclic olefins, such as, for example, norbornene or tetracyclododecene, or copolymers of polycyclic olefins with cycloolefins and/or 1-olefins are obtained without ring opening, in high space-time yield, with a high cycloolefin incorporation rate and at industrially favorable polymerization temperatures, by bulk polymerization in which a catalyst is used which comprises an aluminoxane and a stereorigid chiral metallocene compound of an element from groups IVb to VIb, where the hydrocarbon radicals forming the sandwich structure are different.

6 Claims, 1 Drawing Sheet

EXAMPLE 6

EXAMPLE 4

EXAMPLE 7

EXAMPLE 5

BULK POLYMERIZATION USING SPECIFIC METALLOCENE CATALYSTS FOR THE PREPARATION OF CYCLOOLEFIN POLYMERS

This application is a continuation of application Ser. No. 07/791,566, filed Nov. 12, 1991, now abandoned, which is a continuation-in-part of application Ser. No. 07/548,083, filed July 5, 1990, now U.S. Pat. No. 5,087,677.

The invention relates to a process for the preparation of homopolymers and copolymers of polycyclic olefins in which ring opening does not take place.

It is known that polycyclic olefins can be polymerized by means of various Ziegler catalysts. Depending on the catalyst, the polymerization proceeds via ring opening (cf. U.S. Pat. No. 4,178,424) or opening of the double bond (cf. EP-A 156 464 and EP-A 283 164).

The disadvantage of ring-opening polymerization is that the polymer obtained contains double bonds which can result in chain crosslinking and thus considerably limit the processability of the material by extrusion or injection molding.

Polymerization of cyclic olefins with opening of the double bond results in a relatively low polymerization rate (conversion rate).

A certain increase in the reaction rate has been achieved by using soluble metallocene compounds such as bis(cyclopentadienyl)zirconium dichloride (cf. JP 61/221,206).

Catalysts which can be employed for cyclic olefins are stereorigid, chiral metallocene compounds, such as, for example, ethylenebis(indenyl)zirconium dichloride (cf. EP-A 283 164) or dimethylsilylbis(indenyl)zirconium dichloride (cf. ZA 90/5308), with the polymerization taking place with retention of the ring.

The current state of the art is to carry out the homopolymerization and copolymerization of cycloolefins in solution in the presence of soluble metallocene catalysts, with the solvents employed principally being hydrocarbons.

Experiments have shown that, under the polymerization conditions corresponding to the state of the art, in solution and at relatively low pressures, which are generally below 10 bar, the space-time yield (reaction rate) decreases with increasing concentration of the cycloolefin in the reaction medium, i.e. also with increasing incorporation rate of the cycloolefin. Examples of corresponding cycloolefins are norbornene and tetracyclododecene. The low space-time yield at the same time as a high cycloolefin incorporation rate makes the preparation of cycloolefin copolymers having a high cycloolefin content very complex and economically unfavorable.

Due to their high glass transition temperature, cycloolefin copolymers having a high incorporation rate of cycloolefin have a very high heat distortion temperature. They are therefore interesting materials which should advantageously be usable as thermoplastic molding compositions or in the form of solutions for surface coatings. However, experiments have shown that such solutions can only be processed at high temperatures, in particular due to their tendency to gel.

The object was therefore to find a process for the preparation of cycloolefin homopolymers and copolymers which, based on the polymerization via the double bond, gives, at a high space-time yield, copolymers which have a high cycloolefin incorporation rate and do not gel in solution at room temperature.

It has been found that this object can be achieved by selecting certain reaction conditions and using certain metallocene catalysts. It is important that the polymerization is carried out in the liquid cycloolefin itself or in extremely concentrated cycloolefin solutions, the temperature expediently being above room temperature and the pressure above 1 bar.

The invention thus relates to a process for the preparation of a cycloolefin polymer or copolymer by polymerization of from 0.1 to 100% by weight, based on the total amount of monomers, of at least one monomer of the formula I, II, III, IV, V or VI

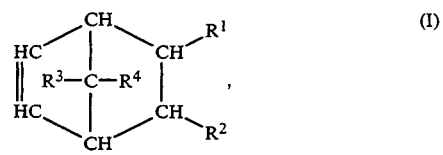

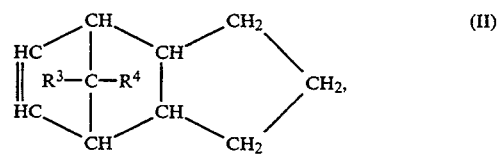

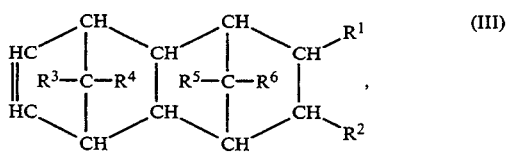

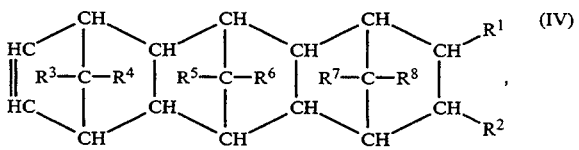

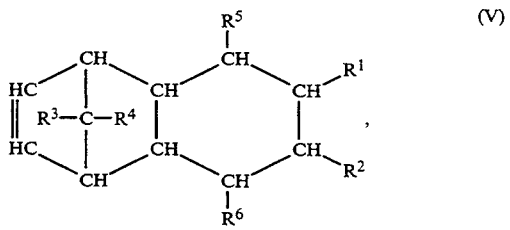

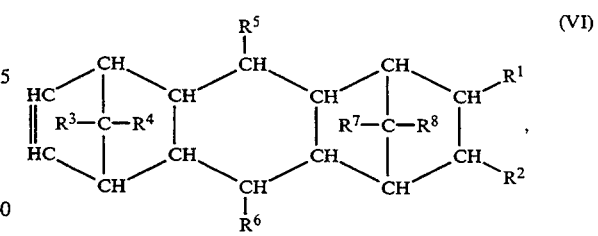

in which $R^1$, $R^2$, $R^3$, $R^4$, $R^5$, $R^6$, $R^7$ and $R^8$ are identical or different and are a hydrogen atom or a $C_1$–$C_8$-alkyl radical, it being possible for identical radicals in the different formulae to have different meanings, from 0 to 99.9% by weight, based on the total amount of monomers, of a cycloolefin of the formula VII $$CH=CH, \atop (CH_2)_n \qquad (VII)$$

in which n is a number from 2 to 10, and from 0 to 99.9% by weight, based on the total amount of monomers, of at least one acyclic 1-olefin of the formula VIII $$R^9 \diagdown_{C=C} \diagup R^{10} \atop R^{11} \diagup \diagdown R^{12} \qquad (VIII)$$

in which $R^9$, $R^{10}$, $R^{11}$ and $R^{12}$ are identical or different and are a hydrogen atom or a $C_1$–$C_8$-alkyl radical, at temperatures of from 20° to 150° C. and at a pressure of from 0.01 to 64 bar, in the presence of a catalyst which comprises an aluminoxane of the formula IX $$R^{13} \diagdown_{Al-O} \left[ \begin{array}{c} R^{13} \\ | \\ Al-O \end{array} \right]_n \diagup^{R^{13}}_{Al} \diagdown R^{13} \qquad (IX)$$

for the linear type and/or of the formula X $$\left[ \begin{array}{c} R^{13} \\ | \\ Al-O \end{array} \right]_{n+2} \qquad (X)$$

for the cyclic type, where, in the formulae IX and X, $R^{13}$ is a $C_1$–$C_6$-alkyl group, phenyl or benzyl, and n is an integer from 2 to 50, and a metallocene of the formula XI $$R^{18} \diagdown_{M^1} \diagup^{R^{16}}_{R^{14}} \diagdown R^{15} \qquad (XI)$$

in which
  $M^1$ is titanium, zirconium, hafnium, vanadium, niobium or tantalum,
  $R^{14}$ and $R^{15}$ are identical or different and are a hydrogen atom, a halogen atom, a $C_1$–$C_{10}$-alkyl group, a $C_1$–$C_{10}$-alkoxy group, a $C_6$–$C_{10}$-aryl group, a $C_6$–$C_{10}$-aryloxy group, a $C_2$–$C_{10}$-alkenyl group, a $C_7$–$C_{40}$-arylalkyl group, a $C_7$–$C_{10}$-alkylaryl group or a $C_8$–$C_{10}$-arylalkenyl group,
  $R^{16}$ and $R^{17}$ are a monocyclic or polycyclic hydrocarbon radical which can form a sandwich structure with the central atom $M^1$,
  $R^{18}$ is $$-\underset{R^{20}}{\overset{R^{19}}{M^2}}-, \quad -\underset{R^{20}}{\overset{R^{19}}{M^2}}-\underset{R^{20}}{\overset{R^{19}}{M^2}}-, \quad -\underset{R^{20}}{\overset{R^{19}}{M^2}}-CR_2^{21}-,$$

-continued
$$-\underset{R^{20}}{\overset{R^{19}}{C}}-, \quad -O-\underset{R^{20}}{\overset{R^{19}}{M^2}}-, \quad -\underset{R^{20}}{\overset{R^{19}}{C}}-\underset{R^{20}}{\overset{R^{19}}{C}}-,$$

$=BR^{19}$, $=AlR^{19}$, —Ge—, —Sn—, —O—, —S—, $=SO$, $=SO_2$, $=NR^{19}$, $=CO$, $=PR^{19}$ or $=P(O)R^{19}$ where $R^{19}$, $R^{20}$ and $R^{21}$ are identical or different and are a hydrogen atom, a halogen atom, a $C_1$–$C_{10}$-alkyl group, a $C_1$–$C_{10}$-fluoroalkyl group, a $C_6$–$C_{10}$-fluoroaryl group, a $C_6$–$C_{10}$-aryl group, a $C_1$–$C_{10}$-alkoxy group, a $C_2$–$C_{10}$-alkenyl group, a $C_7$–$C_{40}$-arylalkyl group, a $C_8$–$C_{40}$-arylalkenyl group or a $C_7$–$C_{40}$-alkylaryl group, or $R^{19}$ and $R^{20}$ or $R^{19}$ and $R^{21}$, in each case with the atoms connecting them, form a ring, and
  $M^2$ is silicon, germanium or tin, which comprises carrying out the polymerization in the liquid cycloolefin monomer or cycloolefin monomer mixture or in an at least 95 percent by volume cycloolefin solution, the substituents $R^{16}$ and $R^{17}$ in the formula XI being different from one another.

The polymerization is preferably carried out in the liquid cycloolefin monomer or cycloolefin monomer mixture.

In the process according to the invention, at least one polycyclic olefin of the formula I, II, III, IV, V or VI, preferably a cycloolefin of the formula I or III, in which $R^1$, $R^2$, $R^3$, $R^4$, $R^5$, $R^6$, $R^7$ and $R^8$ are identical or different and are a hydrogen atom or a $C_1$–$C_8$-alkyl radical, where identical radicals in the different formulae may have different meanings, is polymerized.

It is also possible to use a monocyclic olefin of the formula VII $$CH=CH, \atop (CH_2)_n \qquad (VII)$$

in which n is a number from 2 to 10. Another comonomer is an acyclic 1-olefin of the formula VIII $$R^9 \diagdown_{C=C} \diagup R^{10} \atop R^{11} \diagup \diagdown R^{12} \qquad (VIII)$$

in which $R^9$, $R^{10}$, $R^{11}$ and $R^{12}$ are identical or different and are a hydrogen atom or a $C_1$–$C_8$-alkyl radical. Ethylene or propylene is preferred.

In particular, copolymers of polycyclic olefins, preferably of the formula I or III, with the acyclic olefins VIII are prepared.

Particularly preferred cycloolefins are norbornene and tetracyclododecene, it being possible for these to be substituted by $(C_1$–$C_6)$-alkyl. They are preferably copolymerized with ethylene; ethylene-norbornene copolymers are particularly important.

The polycyclic olefin (I to VI) is employed in an amount of from 0.1 to 100% by weight, and the monocyclic olefin (VII) is employed in an amount of from 0 to 99.9% by weight, in each case based on the total amount of monomers.

The concentration of the open-chain olefin arises from the solubility of the open-chain olefin in the reaction medium at the given pressure and given temperature.

Polycyclic olefins, monocyclic olefins and open-chain olefins are also taken to mean mixtures of two or more olefins of the respective type. This means that, besides polycyclic homopolymers and bicopolymers, it is also possible to prepare tercopolymers and multicopolymers by the process according to the invention. Copolymers of the cycloolefins VII with the acyclic olefins VIII can also advantageously be obtained by the process described. Of the cycloolefins VII, cyclopentene, which may be substituted, is preferred.

The catalyst to be used for the process according to the invention comprises an aluminoxane and at least one metallocene (transition-metal component) of the formula XI

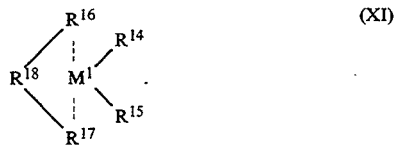
(XI)

In the formula XI, $M^1$ is a metal from the group comprising titanium, zirconium, hafnium, vanadium, niobium and tantalum, preferably zirconium or hafnium. Zirconium is particularly preferred.

$R^{14}$ and $R^{15}$ are identical or different and are a hydrogen atom, a $C_1-C_{10}$-, preferably $C_1-C_3$-alkyl group, a $C_1-C_{10}$-, preferably $C_1-C_3$-alkoxy group, a $C_6-C_{10}$-, preferably $C_6-C_8$-aryl group, a $C_6-C_{10}$, preferably $C_6-C_8$-aryloxy group, a $C_2-C_{10}$-, preferably $C_2-C_4$-alkenyl group, a $C_7-C_{40}$-, preferably $C_7-C_{10}$-arylalkyl group, a $C_7-C_{40}$-, preferably $C_7-C_{12}$-alkylaryl group, a $C_8-C_{40}$-, preferably $C_8-C_{12}$-arylalkenyl group or a halogen atom, preferably chlorine.

$R^{16}$ and $R^{17}$ are different and are a monocyclic or polycyclic hydrocarbon radical, which can form a sandwich structure with the central atom $M^1$. $R^{16}$ is preferably fluorenyl and $R^{17}$ is preferably cyclopentadienyl.

$R^{18}$ is a single- or multimembered bridge which links the radicals $R^{16}$ and $R^{17}$ and is preferably

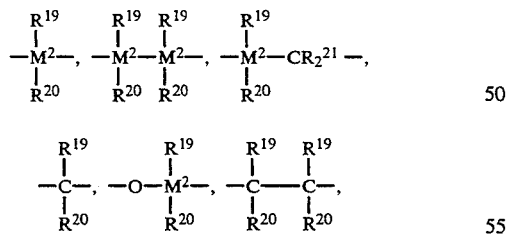

$=BR^{19}, =AlR^{19}, -Ge-, -Sn-, -O-, -S-, =SO, =SO_2, =NR^{19}, =CO, =PR^{19}$ or $=P(O)R^{19}$ where $R^{19}$, $R^{20}$ and $R^{21}$ are identical or different and are a hydrogen atom, a halogen atom, a $C_1-C_{10}$-alkyl group, a $C_1-C_{10}$-fluoroalkyl group, a $C_6-C_{10}$-aryl group, a $C_1-C_{10}$-alkoxy group, a $C_2-C_{10}$-alkenyl group, a $C_7-C_{40}$-arylalkyl group, a $C_8-C_{40}$-arylalkenyl group or a $C_7-C_{40}$-alkylaryl group, or $R^{19}$ and $R^{20}$ or $R^{19}$ and $R^{21}$, in each case together with the atoms connecting them, form a ring.

$R^{18}$ is preferably an

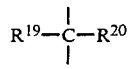

radical and is particularly preferably

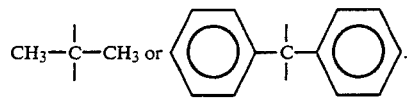

$M^2$ is silicon, germanium or tin, preferably silicon or germanium.

The bridged metallocenes can be prepared in accordance with the known reaction scheme below:

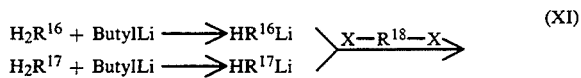
(XI)

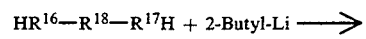

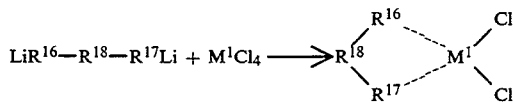

or

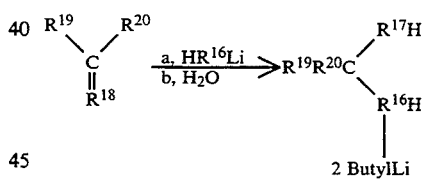

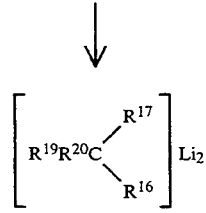

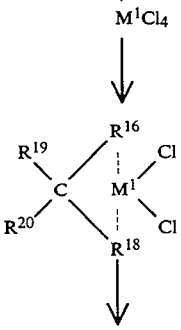

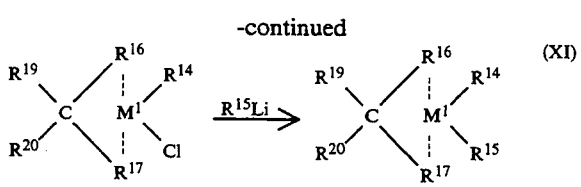

The reaction scheme above also applies to the case where $R^{19}=R^{20}$ and/or $R^{14}=R^{15}$ (cf. Journal of Organometallic Chem. 288 (1985) 63–67 and EP-A 320 762).

Preferred metallocenes are:
diphenylmethylene (9-fluorenyl)cyclopentadienylzirconium dichloride,
isopropylene (9-fluorenyl)cyclopentadienylzirconium dichloride,
methyl(phenyl)methylene(9-fluorenyl)cyclopentadienylzirconium dichloride and
diphenylmethylene(9-fluorenyl)cyclopentadienylhafnium dichloride,
or mixtures thereof.

Particular preference is given to:
diphenylmethylene(9-fluorenyl)cyclopentadienylzirconium dichloride.

The cocatalyst is an aluminoxane of the formula IX

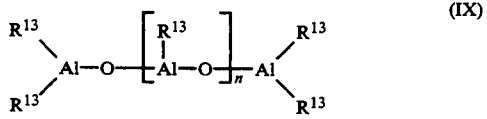

for the linear type and/or of the formula X

for the cyclic type. In these formulae, $R^{13}$ is a $C_1$–$C_6$-alkyl group, preferably methyl, ethyl, isobutyl, butyl or neopentyl, or phenyl or benzyl. Particular preference is given to methyl. n is an integer from 2 to 50, preferably from 5 to 40. However, the precise structure of the aluminoxane is not known.

The aluminoxane can be prepared in various ways (cf. S. Pasynkiewicz, Polyhedron 9 (1990) 429).

In one of the processes, finely powdered copper sulfate pentahydrate is slurried in toluene or a cycloolefin (for example cyclopentene, norbornene or tetracyclododecene), and sufficient trialkylaluminum to give about 1 mol of $CuSO_4.5H_2O$ for every 4 aluminum atoms is added in a glass flask under an inert gas at about −20° C. or just above the melting point of the cycloolefin. After slow hydrolysis with elimination of alkane, the reaction mixture is left at room temperature for from 24 to 48. hours, during which it may be necessary to cool the mixture so that the temperature does not exceed 30° C. The aluminoxane, dissolved in the toluene or cycloolefin, is subsequently filtered off from the copper sulfate, and the solution is evaporated in vacuo. It is assumed that the low-molecular-weight aluminoxanes condense in this preparation process to form higher oligomers with elimination of trialkylaluminum.

Aluminoxanes are also obtained when trialkylaluminum, preferably trimethylaluminum, dissolved in an inert aliphatic or aromatic solvent, preferably heptane or toluene, is reacted with aluminum salts, preferably aluminum sulfate, containing water of crystallization at a temperature of from −20 to 100° C. The ratio by volume between the solvent and the alkylaluminum used is from 1:1 to 50:1, preferably 5:1, and the reaction time, which can be monitored through the elimination of the alkane, is from 1 to 200 hours, preferably from 10 to 40 hours.

Of the aluminum salts containing water of crystallization, those are used, in particular, which have a high content of water of crystallization. Particular preference is given to aluminum sulfate hydrate, in particular the compounds $Al_2(SO_4)_3.16H_2O$ and $Al_2(SO_4)_3.18H_2O$, having the particularly high water of crystallization content of 16 and 18 mol respectively of $H_2O$/mol of $Al_2(SO_4)_3$.

A further variant of the preparation of aluminoxanes is to dissolve trialkylaluminum, preferably trimethylaluminum, in the liquid monomer in heptane or toluene in the polymerization reactor, and then to react the aluminum compound with water.

It is also possible for the aluminoxane to be adsorbed onto a support and then employed as a suspension in supported form. Several support processes are known. For example, slightly moist silica gel can act as a support.

In addition to the above-outlined processes for the preparation of aluminoxanes, there are others which can be used. Irrespective of the type of preparation, a varying content of unreacted trialkylaluminum, which is in free form or as an adduct, is common to all the aluminoxane solutions. This content has an as yet not precisely explained effect on the catalytic activity, which varies depending on the metallocene compound employed.

If preactivation of the transition-metal compound is necessary, it is carried out in solution. In this case, the metallocene is preferably dissolved in a solution of the aluminoxane in a hydrocarbon. Suitable hydrocarbons are aliphatic or aromatic hydrocarbons and cycloolefins, such as, for example, cyclopentene, norbornene or tetracyclododecene.

Toluene is preferred.

The preactivation can also be carried out in suspensions of supported aluminoxane.

The concentration of the aluminoxane in the solution is in the range from about 1% by weight up to the saturation limit, preferably from 5 to 30% by weight, in each case based on the total solution. The metallocene can be employed in the same concentration, but is preferably employed in an amount of from $10^{-4}$−1 mol per mole of aluminoxane. The preactivation time is from 0 to 60 minutes. The preactivation temperature is from 0° to 70° C.

If a small amount of solvent is added to the reaction mixture, the solvent is a customary inert solvent, such as, for example, an aliphatic or cycloaliphatic hydrocarbon, a petroleum ether or hydrogenated diesel oil fraction, or toluene.

Polymerization by the process according to the invention offers the advantage of achieving a high space-time yield (reaction rate) and a high cycloolefin incorporation rate. It has been found that increasing the concentration of the open-chain olefin, for example by increasing the partial pressure of this open-chain olefin, allows the reaction rate to be significantly increased. If pure open-chain olefin, for example ethylene, is injected, pressures of between 0.01 and 64 bar, preferably from 2 to 40 bar and particularly preferably from 4 to 20 bar, are employed. If an inert gas, for example nitrogen or argon, is also injected in addition to the open-chain olefin, the total pressure in the reaction vessel is from 2 to 64 bar, preferably from 5 to 64 bar and particularly preferably from 6 to 40 bar. The fact that the cycloolefinic component is in undiluted form means that a high cycloolefin incorporation rate is achieved even at high pressures. In addition, the reaction rate can also be increased by increasing the temperature, the upper limit to the temperature range being set by the thermal stability of the catalyst and the lower limit by the melting point of the cycloolefin at the corresponding pressure. However, increasing temperature is accompanied by a simultaneous drop in the solubility of the gaseous olefin in the reaction medium and results in an increase in the incorporation rate of the cycloolefin in the copolymer. In order to obtain constant incorporation rates with increasing temperature, the pressure of the open-chain and gaseous olefin must be increased correspondingly.

Continuous and multistep polymerization processes are particularly advantageous since they enable efficient use of the cycloolefin. In continuous processes, the polycyclic olefin, which can arise as a residual monomer together with the polymer, can also be recovered and recycled into the reaction mixture.

Here, the process according to the invention offers the advantage over polymerization in solution that, due to the absence of a solvent or an extremely low solvent concentration, the technical complexity on recovery of the cycloolefins from the reaction mixture or from a precipitation bath is much lower.

The metallocene compound is used in a concentration, based on the transition metal, of from $10^{-3}$ to $10^{-7}$, preferably from $10^{-4}$ to $10^{-6}$, mol of transition metal per $dm^3$ of reactor volume. The aluminoxane is used in a concentration of from $10^{-4}$ to $10^{-1}$, preferably from $10^{-4}$ to $2 \cdot 10^{-2}$ mol per $dm^3$ of reactor volume, based on the aluminum content. In principle, however, higher concentrations are also possible. In order to combine the polymerization properties of different metallocenes, it is possible to employ mixtures of a plurality of metallocenes.

When preparing copolymers, the molar ratios between the polycyclic olefin and the open-chain olefin (preferably) employed can be varied within a broad range. Molar ratios of from 3:1 to 100:1 of cycloolefin to open-chain olefin are preferably employed. The choice of polymerization temperature, the concentration of the catalyst component and the molar ratio employed or the pressure of the gaseous, open-chain olefin allow the incorporation rate of comonomer to be controlled virtually as desired. Preferred incorporation rates are between 20 and 75 mol-% of the cyclic component and particularly preferred incorporation rates are between 35 and 65 mol-% of the cyclic component.

The mean molecular weight of the copolymer formed can be controlled in a known manner by metering in hydrogen, varying the catalyst concentration or varying the temperature.

The polydispersity $M_w/M_n$ of the copolymers is extremely narrow, with values between 2.0 and 3.5. This results in a property profile of the polymers which makes them particularly suitable for injection molding.

Surprisingly, it has been found that the bulk process according to the invention, for the same incorporation rates and comparable reaction rates, results in higher molecular weights than does conventional solution polymerization.

If the possibilities of varying the molecular weight are taken into account, the process according to the invention significantly broadens the accessible molecular weight range for the cycloolefin copolymers.

The preferred catalysts according to the invention result, both in "solution polymerization" and in bulk polymerization, in significantly higher molecular weights than do other metallocene catalysts known hitherto.

The process described allows amorphous copolymers to be prepared. The copolymers are transparent and hard. They are soluble, for example, in decahydronaphthalene at 135° C. and in toluene at room temperature. The polymers according to the invention can be processed as thermoplastics. Both on extrusion and on injection molding, no significant degradation or decrease in viscosity was found.

Surprisingly, it has been found that the cycloolefin copolymers prepared using the process according to the invention—and the preferred metallocenes according to the invention—do not gel in solution at room temperature. They are therefore particularly suitable for coatings, for the production of cast films and for other applications in which cycloolefin solutions must be stored and transported. The flowability of the corresponding solutions also has a positive effect on the work-up of the polymer solutions after the polymerization. For example, the solution can be filtered more easily; concentration in a thin-film evaporator can be carried out with lower thermal and mechanical stress of the polymer solution.

Furthermore, it has been determined from NMR spectra that these cycloolefin copolymers also differ significantly in their microstructure from those which gel in solution. This difference could be explained by the fact that the catalysts according to the invention polymerize strictly syndiospecifically due to the different $R^{16}$ and $R^{17}$ substituents. According to the current state of knowledge, it must be assumed that the cycloolefin copolymers according to the invention contain disyndiotactic cycloolefin sequences which enable structures to be differentiated by NMR.

The materials prepared according to the invention are particularly suitable for the production of extruded parts, such as films, tubes, pipes, rods and fibers, and for the production of injection moldings of any desired shape and size. An important property of the materials according to the invention is their transparency. The optical applications, in particular, of the extruded or injection-molded parts of these materials thus have considerable importance. The refractive index, determined using an Abbe refractometer and mixed light, of the reaction products described in the examples below is in the range from 1.520 to 1,555. Since the refractive index is very close to that of crown glass (n=1.51), the products according to the invention can be used in a variety of ways as a glass substitute, such as, for example, for lenses, prisms, baseplates and films for optical data media, for video disks, for compact disks, as cover and focusing screens for solar cells, as cover and diffusion screens for high-performance optics, and as optical waveguides in the form of fibers or films.

The polymers according to the invention can also be employed for the preparation of polymer alloys. The alloys can be prepared in the melt or in solution. The alloys each have a favorable property combination of the components for certain applications. The following polymers can be employed for alloys containing the polymers according to the invention:
polyethylene, polypropylene, (ethylene-propylene) copolymers, polybutylene, poly(4-methyl-1-pentene), polyisoprene, polyisobutylene, natural rubber, poly(methyl methacrylate), further polymethacrylates, polyacrylates, (acrylate-methacrylate) copolymers, polystyrene, (styrene-acrylonitrile) copolymers, bisphenol A polycarbonate, further polycarbonates, aromatic polyester carbonates, polyethylene terephthalate, polybutylene terephthalate, amorphous polyarylates, nylon 6, nylon 66, further polyamides, polyaramids, polyether ketones, polyoxymethylene, polyoxyethylene, polyurethanes, polysulfones, polyether sulfones and polyvinylidene fluoride.

The glass transition temperatures (Tg) given in the examples below were determined by DSC (Differential Scanning Calorimetry) at a heating rate of 20° C./min. The viscosities given were determined in accordance with DIN 53 728.

EXAMPLE 1

Figure 1:
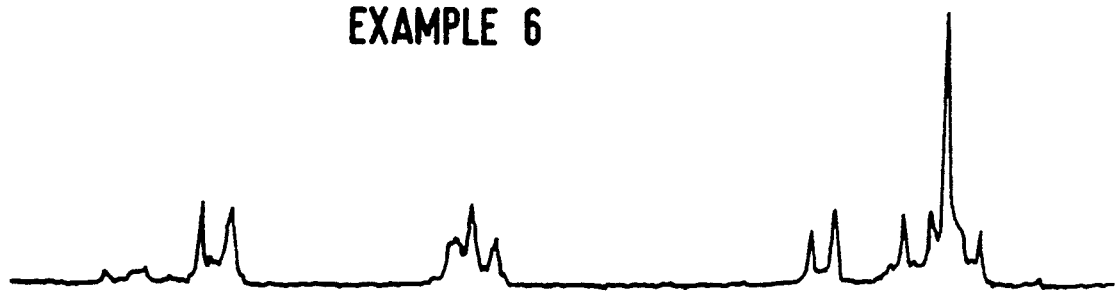
FIG. 1 shows $^{13}$C-NMR spectra of polymer samples produced in examples 4–7. The samples were dissolved in a mixture of hexachlorobutadiene and tetrachloroethane-d$_2$ and measured using a 400 MHZ NMR instrument.
Figure 1:
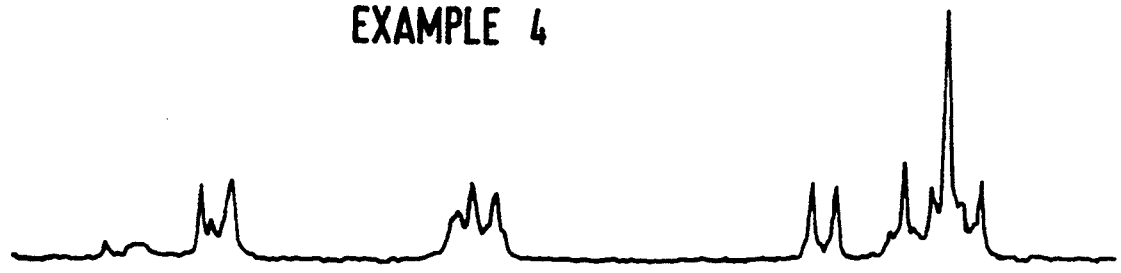
Figure 1:
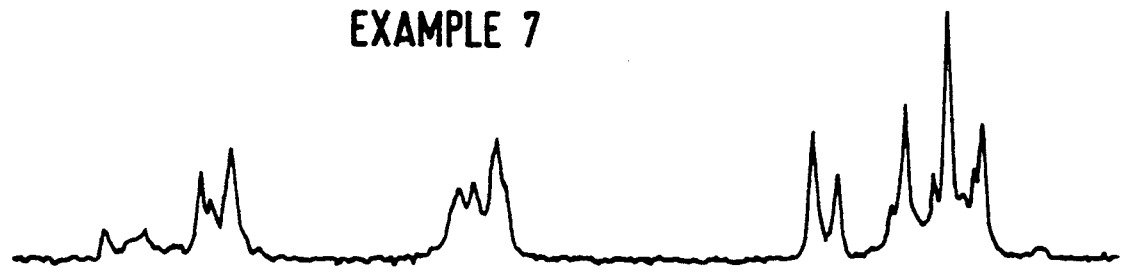
Figure 1:
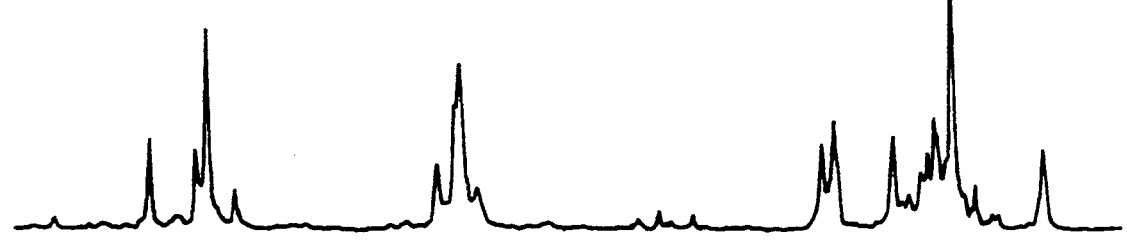
Figure 1:
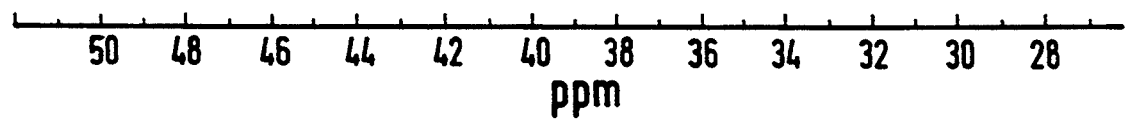

A clean and dry 1.5 dm$^3$ polymerization reactor equipped with stirrer was flushed with nitrogen and then with ethylene and charged with 560 g of norbornene melt at 70° C. The reactor was then kept at a temperature of 70° C. with stirring, and 6 bar of ethylene (overpressure) were injected.

5 cm$^3$ of a toluene solution of methylaluminoxane (MAO solution) (10.1% by weight of methylaluminoxane having a molecular weight of 1300 g/mol, determined cryoscopically) were then metered into the reactor, and the mixture was stirred at 70° C. for 15 minutes, with the ethylene pressure being kept at 6 bar by re-metering. In parallel, 10.2 mg of diphenylmethylene(9-fluorenyl)cyclopentadienylzirconium dichloride were dissolved in 5 cm$^3$ of a toluene solution of methylaluminoxane (concentration and quality see above), and the solution was preactivated by standing for 15 minutes. The solution of the complex was then metered into the reactor (in order to reduce the molecular weight, hydrogen can be introduced into the reactor via a lock immediately after the metering-in of the catalyst). The mixture is then polymerized at 70° C. for 0.5 hour with stirring (750 rpm), during which the ethylene pressure was kept at 6 bar by re-metering. The reactor contents were then discharged rapidly into a stirred vessel containing 100 cm$^3$ of isopropanol. The mixture was introduced dropwise into 2 dm$^3$ of acetone, the mixture was stirred for 10 minutes, and the suspended polymeric solid was then filtered off.

The polymer filtered off was then introduced into 2 dm$^3$ of a mixture of two parts of 3 normal hydrochloric acid and one part of ethanol, and this suspension was stirred for 2 hours. The polymer was then filtered off again, washed with water until neutral and dried for 15 hours at 80° C. and 0.2 bar. 40.4 g of product were obtained. A viscosity of 112 cm$^3$/g and a glass transition temperature (Tg) of 183° C. were measured on the product.

EXAMPLES 2 and 3

The polymerizations were carried out analogously to Example 1, with some conditions, summarized in Table 1, being changed.

TABLE 1

| Example | Cycloolefin (g) | Metallocene | Amount of metallocene (mg) | Ethylene pressure (bar) | Time (h) | Yield (g) | Visc. (cm$^3$/g) | Tg (°C.) |
|---|---|---|---|---|---|---|---|---|
| 2 | Norbornene | B | 0.5 | 10 | 0.5 | 37 | 210 | 161.5 |
| 3 | DMON 400 | A | 10.0 | 6 | 0.3 | 31 | 135 | 206.9 |

A = Diphenylmethylene(9-fluorenyl)cyclopentadienyl-zirconium dichloride
B = Isopropylene(9-fluorenyl)cyclopentadienylzirconium dichloride
DMON = Tetracyclododecene

EXAMPLE 4

A clean and dry 75 dm$^3$ polymerization reactor equipped with stirrer was flushed with nitrogen and then with ethylene and charged with 22,000 g of norbornene melt (Nb). The reactor was then heated to a temperature of 70° C. with stirring, and 15 bar of ethylene were injected.

580 cm$^3$ of a toluene solution of methylaluminoxane (10.1% by weight of methylaluminoxane having a molecular weight of 1300 g/mol, determined cryoscopically) were then metered into the reactor, and the mixture was stirred at 70° C. for 15 minutes, during which the ethylene pressure was kept at 15 bar by re-metering. In parallel, 500 mg of metallocene A were dissolved in 500 cm$^3$ of a toluene solution of methylaluminoxane (concentration and quality see above), and the solution was preactivated by standing for 15 minutes. The solution of the complex (catalyst solution) was then metered into the reactor (in order to reduce the molecular weight, hydrogen can be introduced into the reactor via a lock immediately after the metering-in of the catalyst). The mixture was then polymerized at 70° C. for 1.3 hours with stirring (750 rpm), during which the ethylene pressure was kept at 15 bar by re-metering. The reactor contents were then discharged rapidly into a stirred vessel containing 200 cm$^3$ of isopropanol (as stopper). The mixture was precipitated in acetone, the precipitate was stirred for 10 minutes, and the suspended polymeric solid was then filtered off.

The polymer filtered off was then treated with a mixture of two parts of 3 normal hydrochloric acid and one part of ethanol, and the mixture was stirred for 2 hours. The polymer was then filtered off again, washed with water until neutral and dried for 15 hours at 80° C. and 0.2 bar. 5500 g of product were obtained. A viscosity of 163 cm$^3$/g and a glass transition temperature (Tg) of 144° C. were measured on the product.

TABLE 2

Examples 5 to 12:
The polymerization was carried out analogously to Example 4, with some conditions, summarized in Table 2, being changed.

| Example | Amount of norbornene (g) | T (°C.) | Pressure (bar) | Metallocene | Amount of metallocene (mg) | Catalyst solution (ml) | Time (min) | Amount of product (g) | Tg (°C.) | Visc. (cm³/g) |
|---|---|---|---|---|---|---|---|---|---|---|
| 5 (comp. example) | 24800 | 70 | 15 | C | 3000 | 1000 | 220 | 5100 | 147 | 90 |
| 6 | 24800 | 50 | 15 | A | 1000 | 1000 | 45 | 4500 | 122 | 103* |
| 7 | 22000 | 70 | 10 | A | 500 | 500 | 140 | 4400 | 168 | 208 |
| 8 | 24800 | 50 | 8 | B | 25 | 500 | 40 | 4500 | 151 | 124 |
| 9 | 22000 | 70 | 10 | B | 25 | 500 | 35 | 4200 | 153 | 129 |
| 10 | 22000 | 70 | 2 | B | 50 | 500 | 60 | 4400 | 192 | 90 |
| 11 | 22500 | 70 | 0.5 | B | 50 | 500 | 90 | 2500 | 235 | 21 |
| 12 | 22500 | 70 | 1.5 | A | 500 | 500 | 200 | 3200 | 207 | 60 |

*3.5 l of hydrogen were added
Metallocene C: rac-dimethylsilylbis(1-indenyl)zirconium dichloride

COMPARATIVE EXAMPLE 13 (SOLUTION POLYMERIZATION)

A clean and dry 1.5 dm³ polymerization reactor equipped with stirrer was flushed with nitrogen and then with ethylene and charged with a solution of 411 g of norbornene (Nb) and 86 cm³ of toluene. The reactor was then heated to a temperature of 70° C. with stirring and 8 bar of ethylene were injected.

20 cm³ of a toluene solution of methylaluminoxane (10.1% by weight of methylaluminoxane having a molecular weight of 1300 g/mol, determined cryoscopically) were then metered into the reactor, and the mixture was stirred at 70° C. for 15 minutes, during which the ethylene pressure was kept at 8 bar by re-metering. In parallel, 71.8 mg of dicyclopentadienylzirconium dichloride were dissolved in 10 cm³ of a toluene solution of methylaluminoxane (concentration and quality see above), and the solution was preactivated by standing for 15 minutes. The solution of the complex was then metered into the reactor. The mixture was then polymerized at 70° C. for 2 hours with stirring (750 rpm), during which the ethylene pressure was kept at 8 bar by re-metering. The reactor contents were then discharged rapidly into a stirred vessel containing 100 cm³ of isopropanol. The mixture was introduced dropwise into 2 dm³ of acetone, the mixture was stirred for 10 minutes, and the suspended polymeric solid was then filtered off.

The polymer filtered off was then introduced into 2 dm³ of a mixture of two parts of 3 normal hydrochloric acid and one part of ethanol, and this suspension was stirred for 2 hours. The polymer was then filtered off again, washed with water until neutral and dried for 15 hours at 80° C. and 0.2 bar. 73.5 g of product were obtained. A viscosity of 17 cm³/g and a glass transition temperature (Tg) of 168.5° C. were measured on the product.

TABLE 3

Comparative Examples 14 to 16
Polymers were prepared analogously to Comparative Example 13, the polymerization conditions being changed in accordance with Table 3.

| Example | Amount of norbornene (g) | Solvent* | Amt. of sol. vent (ml) | T (°C.) | Pressure (bar) | MAO solution (ml) | Metallocene** | Amt. of metallocene (mg) | Cat. solution (ml) | Time (min) | Stopper*** | Amt. of stopper (ml) | Wash with HCl solution | Amt. of product (g) | Tg (°C.) | Visc. (cm³/g) |
|---|---|---|---|---|---|---|---|---|---|---|---|---|---|---|---|---|
| 14 | 107 | L | 750 | 20 | 1 | 20 | D | 59 | 10 | 60 | IP | 20 | yes | 48 | 115 | 200 |
| 15 | 481 | L | 100 | 70 | 3 | 20 | D | 62 | 10 | 60 | IP | 20 | yes | 25 | 156 | 55 |
| 16 | 214 | L | 750 | 50 | 1.8 | 20 | C | 60 | 10 | 75 | W | 30 | no | 55 | 135 | 83 |

*L = solvent mixture comprising 94% by volume of ®Exsol and 6% by volume of toluene
**Metallocene D: rac-ethylenebis(1-indenyl)zirconium dichloride
***IP = isopropanol
W = water

EXAMPLE 17

20% strength by weight toluene solutions of each of the polymers of Examples 4 and 6 to 9 were prepared in 250 ml flasks at 70° C. The solutions were clear and free-flowing. The flowability of the solutions was determined by tilting the flasks. After the solutions had been cooled to room temperature, the flowability was determined as a function of time. All the solutions investigated were still free-flowing after 50 days.

COMPARATIVE EXAMPLE 18

Solutions of various polymers prepared in accordance with Comparative Examples 5 and 13 to 16 were prepared and investigated analogously to Example 17. All the solutions were no longer free-flowing after only 8 hours at room temperature. All the solutions had gelled, i.e. they remained shape-stable in the tilt experiment.

EXAMPLE 19

GPC (Gel Permeation Chromatography) measurements were carried out on various samples. A Millipore Waters Chrom. type 150-C ALC/GPC chromatograph and a column set comprising 4 Shodex AT-80 M/S columns were used. The solvent was o-dichlorobenzene.

Other measurement parameters were:
Temperature: 135° C.
Flow rate: 0.5 ml/min
Amount of sample: 0.4 ml of sample solution Concentration of the sample solution: 0.1 g/dl
Calibration: by polyethylene standard
The GPC measurement results are as follows:

| Sample | Weight average $M_w$ g/mol | No. average $M_n$ g/mol | $M_w/M_n$ |
|---|---|---|---|
| According to Comparative Example 5 | 75,600 | 37,200 | 2 |
| According to Example 7 | 391,000 | 163,000 | 2.4 |

EXAMPLE 20

13-C-NMR spectra were recorded for samples from Examples 4 to 7. The samples were dissolved in a mixture of hexachlorobutadiene and tetrachloroethane-$d_2$ and measured using a 400 MHz NMR instrument. The spectra are reproduced comparatively in FIG. 1. Surprisingly, it can be seen that the structure of the polymers of Examples 4, 6 and 7 differs significantly from that of Comparative Example 5.

In the case of the metallocene C (rac-dimethylsilyl-bis(1-indenyl)zirconiumdichloride) used in Comparative Example 5, the substituents $R^{16}$ and $R^{17}$ are identical.

EXAMPLES 21-23

The polymerizations were carried out analogously to Example 1, with some conditions, summarized in Table 4, being changed.

TABLE 4

| Example | Cyclo-olefin (g) | Metal-locene | Amount of metallocene (mg) | Ethylene pressure (bar) | Time (h) | Yield (g) | Visc. (cm³/g) | Tg (°C.) |
|---|---|---|---|---|---|---|---|---|
| 21 | Norbornene | E | 1 | 6 | 1 | 36 | 119 | 178 |
| 22 | Norbornene | F | 20 | 6 | 3 | 33 | 125 | 183 |
| 23 | Norbornene | G | 1 | 1.5 | 1 | 22 | 40 | 239 |

E = methyl(phenyl)methylene(9-fluorenyl)cyclopentadienyl zirconium dichloride
F = diphenylmethylene(9-fluorenyl)cyclopentadienylhafnium dichloride
G = isopropylene(l-indenyl)cyclopentadienylzirconium dichloride

EXAMPLE 24 (POLYNORBORNENE)

800 g of norbornene were liquefied with 25 cm³ of a 10.1% strength by weight toluene solution of methylaluminoxane with warming in a 1.5 dm³ polymerization reactor (see Example 1).

In parallel, 250 mg of diphenylmethylene(9-fluorenyl)cyclopentadienylzirconium dichloride were dissolved in 25 cm³ of a 10.1% strength toluene solution of methylaluminoxane, and the solution was added to the above melt. The mixture was polymerized for 160 hours at 35° C. under argon.

The solution was worked up analogously to Example 1. After drying, 41 g of a colorless powder were obtained. A viscosity of 44 cm³/g was measured on the product. Neither a glass state nor a melting point were detectable up to 380° C. using DSC. Softening was observable at about 400° C. under a heating-stage microscope.

$^{13}$C-NMR spectrum (analogously to Example 20) showed very broad signals with peak maxima at 31, 40 and 50 ppm. According to NMR and infra-red spectra, the product contains no double bonds.

EXAMPLE 25

10–20% strength toluene solutions of the polymer from Example 24 were prepared, and the solution was coated onto glass plates using a doctor blade. After drying in vacuo (0.2 bar) at 80° C., transparent, colorless films having thicknesses between 1 and 100 μm were obtained.

We claim:

1. A process for the preparation of a cycloolefin polymer or copolymer which is non-gelling in solution at room temperature by polymerization of from 0.1 to 100% by weight, based on the total amount of monomers, of at least one monomer of the formula I, II, III, IV, V or VI

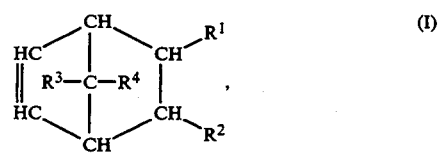

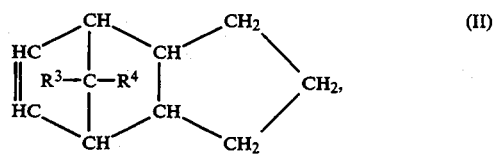

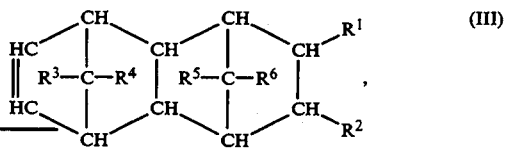

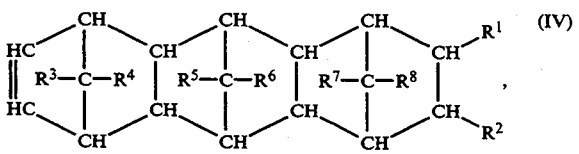

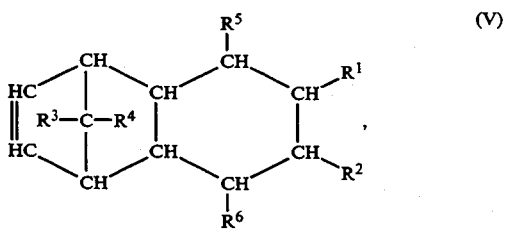

-continued

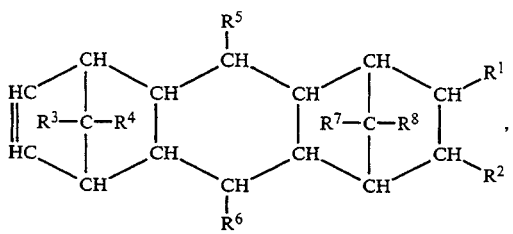

in which $R^1$, $R^2$, $R^3$, $R^4$, $R^5$, $R^6$, $R^7$ and $R^8$ are identical or different and are a hydrogen atom or a $C_1$-$C_8$-alkyl radical, it being possible for identical radicals in the different formulae to have different meanings, from 0 to 99.9% by weight, based on the total amount of monomers, of a cycloolefin of the formula VII

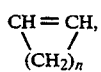

in which n is a number from 2 to 10, and from 0 to 99.9% by weight, based on the total amount of monomers, of at least one acyclic 1-olefin of the formula VIII

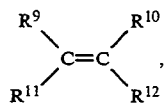

in which $R^9$, $R^{10}$, $R^{11}$ and $R^{12}$ are identical or different and are a hydrogen atom or a $C_1$-$C_8$-alkyl radical, at temperatures of from 20° to 150° C. and at a pressure of from 0.01 to 64 bar, in the presence of a catalyst which comprises an aluminoxane of the formula IX

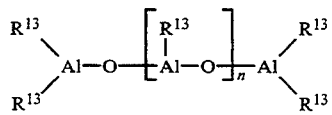

for the linear type and/or of the formula X

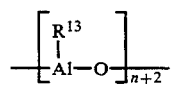

for the cyclic type, where, in the formulae IX and X, $R^{13}$ is a $C_1$-$C_6$-alkyl group, phenyl or benzyl, and n is an integer from 2 to 50, and a metallocene of the formula XI

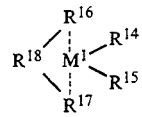

in which $M^1$ is titanium, zirconium, hafnium, vanadium, niobium or tantalum, $R^{14}$ and $R^{15}$ are identical or different and are a hydrogen atom, a halogen atom, a $C_1$-$C_{10}$-alkyl group, a $C_1$-$C_{10}$-alkoxy group, a $C_6$-$C_{10}$-aryl group, a $C_6$-$C_{10}$-aryloxy group, a $C_2$-$C_{10}$-alkenyl group, a $C_7$-$C_{40}$-arylalkyl group, a $C_7$-$C_{40}$-alkylaryl group or a $C_8$-$C_{40}$-arylalkenyl group, $R^{16}$ and $R^{17}$ are a monocyclic or polycyclic hydrocarbon radical which can form a sandwich structure with the central atom $M^1$, $R^{18}$ is

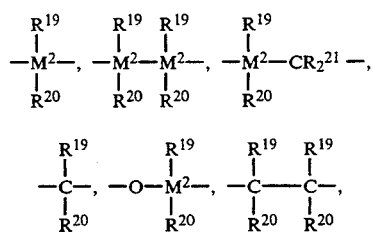

$=BR^{19}$, $=AlR^{19}$, —Ge—, —Sn—, —O—, —S—, $=SO$, $=SO_2$, $=NR^{19}$, $=CO$, $=PR^{19}$ or $=P(O)R^{19}$ where $R^{19}$, $R^{20}$ and $R^{21}$ are identical or different and are a hydrogen atom, a halogen atom, a $C_1$-$C_{10}$-alkyl group, a $C_1$-$C_{10}$-fluoroalkyl group, a $C_6$-$C_{10}$-fluoroaryl group, a $C_6$-$C_{10}$-aryl group, a $C_1$-$C_{10}$-alkoxy group, a $C_2$-$C_{10}$-alkenyl group, a $C_7$-$C_{40}$-arylalkyl group, a $C_8$-$C_{40}$-arylalkenyl group or a $C_7$-$C_{40}$-alkylaryl group, or $R^{19}$ and $R^{20}$ or $R^{19}$ and $R^{21}$, in each case with the atoms connecting them, form a ring, and $M^2$ is silicon, germanium or tin, which comprises carrying out the polymerization in the liquid cycloolefin monomer or cycloolefin monomer mixture or in at least 95 percent by volume cycloolefin solution, the substituents $R^{16}$ and $R^{17}$ in the formula XI being different from one another.

2. The process as claimed in claim 1, wherein the polymerization is carried out in the liquid cycloolefin monomer or cycloolefin monomer mixture.

3. The process as claimed in claim 1, wherein the metallocene of the formula XI is diphenylmethylene (9-fluorenyl)cyclopentadienylzirconium dichloride, isopropylene(9-fluorenyl)cyclopentadienylzirconium dichloride, methyl(phenyl)methylene(9-fluorenyl) cyclopentadienylzirconium dichloride or diphenylmethylene(9-fluorenyl)cyclopentadienylhafnium dichloride.

4. The process as claimed in claim 1, wherein the polycyclic olefin is norbornene or tetracyclododecene.

5. The process as claimed in claim 1, wherein a copolymer of norbornene and ethylene is prepared.

6. A cycloolefin polymer or copolymer which can be prepared by the process as claimed in claim 1.

* * * * *